United States Patent
Vuppu et al.

(10) Patent No.: US 8,682,388 B2
(45) Date of Patent: Mar. 25, 2014

(54) MOBILE DEVICE AND METHOD FOR PROXIMITY DETECTION VERIFICATION

(75) Inventors: Sandeep Vuppu, Wheeling, IL (US); Chris Grivas, Crystal Lake, IL (US); Hong Zhao, Naperville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 311 days.

(21) Appl. No.: 12/983,121

(22) Filed: Dec. 31, 2010

(65) Prior Publication Data

US 2012/0172085 A1   Jul. 5, 2012

(51) Int. Cl.
*H04W 88/02* (2009.01)

(52) U.S. Cl.
USPC .................. 455/556.1; 348/14.02; 340/686.6; 345/173

(58) Field of Classification Search
USPC ...................... 455/556.1; 340/686.6; 345/173
See application file for complete search history.

(56) References Cited

U.S. PATENT DOCUMENTS

| | | | |
|---|---|---|---|
| 5,854,617 A | 12/1998 | Lee et al. |
| 6,246,862 B1 | 6/2001 | Grivas et al. |
| 6,278,887 B1 | 8/2001 | Son et al. |
| 7,251,350 B2 | 7/2007 | Tsirkel et al. |
| 7,636,456 B2 | 12/2009 | Collins et al. |
| 7,643,658 B2 | 1/2010 | Kilner et al. |
| 2007/0004470 A1 | 1/2007 | Goris et al. |
| 2007/0075965 A1 | 4/2007 | Huppi et al. |
| 2007/0126884 A1 | 6/2007 | Xu et al. |
| 2007/0182703 A1 | 8/2007 | Brubacher-Cressman et al. |
| 2007/0189751 A1 | 8/2007 | Yoon et al. |
| 2007/0285528 A1 | 12/2007 | Mise et al. |
| 2008/0118152 A1 | 5/2008 | Thorn et al. |
| 2008/0199049 A1 | 8/2008 | Daly |
| 2009/0082066 A1 | 3/2009 | Katz |

(Continued)

FOREIGN PATENT DOCUMENTS

EP   2096624 A1   9/2009
EP   2112807 A1   10/2009

OTHER PUBLICATIONS

Patent Cooperation Treaty, "PCT Search Report and Written Opinion of the International Searching Authority" for International Application No. PCT/US2011/067473 dated Jun. 4, 2012, 18 pages.

(Continued)

*Primary Examiner* — Phuoc Doan
(74) *Attorney, Agent, or Firm* — Whyte Hirschboeck Dudek S.C.

(57) ABSTRACT

A mobile device includes a touch screen display and touch screen circuit for receiving touch inputs. A camera configured to acquire one or more images in front of the display. A proximity sensor configured to provide an indication that a user is in close proximity to the touch screen display. A processor being effective to determine, in response to the indication of the proximity sensor, whether the user is in a position to view the display based on the one or more images of the camera. If the proximity sensor provides an indication that the user is in close proximity to the display and the processor determines, based on the one or more images, that the user is in a position to view the display, then at least one of the display and the touch screen circuit are not disabled.

17 Claims, 3 Drawing Sheets

(56) References Cited

U.S. PATENT DOCUMENTS

| | | |
|---|---|---|
| 2009/0160541 A1 | 6/2009 | Liu |
| 2009/0262078 A1 | 10/2009 | Pizzi |
| 2009/0303199 A1* | 12/2009 | Cho et al. .................. 345/173 |
| 2010/0029328 A1 | 2/2010 | Kuo et al. |
| 2010/0117949 A1 | 5/2010 | Lai et al. |
| 2012/0169594 A1 | 7/2012 | Zhao et al. |

OTHER PUBLICATIONS

Patent Cooperation Treaty, "PCT Search Report and Written Opinion of the International Searching Authority" for International Application No. PCT/US2011/067348, Apr. 27, 2012, 18 pages.

United States Patent and Trademark Office, "Non-Final Rejection" for U.S. Appl. No. 12/982,474 dated Mar. 29, 2013, 22 pages.

* cited by examiner

MOBILE DEVICE AND METHOD FOR PROXIMITY DETECTION VERIFICATION

FIELD OF THE INVENTION

The present invention relates to a mobile device and corresponding method for proximity detection verification.

BACKGROUND

Portable electronic devices such as mobile phones, smart phones, personal digital assistants (PDAs), and tablets have become popular and ubiquitous. More and more features and applications have been added to these devices, including call, text, and e-mail functions, internet access, cameras, navigation applications, media storage and display applications, as well as others. These devices typically include a display with a graphics screen, such as a liquid crystal display (LCD) screen or panel, which generally needs a backlight in order for images to be visible. This is because LCDs do not produce light, unlike for example cathode ray tube (CRT) displays. Specifically, a backlight illuminates an LCD from the back or side of the display panel. Various types of backlights are known, including for example, incandescent light bulbs, light-emitting diodes (LEDs), an electroluminescent panel (ELP), one or more Cold Cathode Fluorescent Lamps (CCFL), or Hot Cathode Fluorescent Lamps (HCFL).

In some devices, backlights and the graphics panel are controlled to be turned off after a predetermined time period in order to conserve power, because many mobile devices are battery powered and these components can be a significant drain on the battery when turned on. Mobile electronic devices generally rely on a battery as a power source and therefore are sensitive to power draining components. A graphics screen backlight typically consumes an appreciable amount of power when illuminated and as such, can substantially reduce battery life (i.e., the time the battery will operate before it must be recharged). To reduce the power consumed by the backlight and graphics display screen during operation of a mobile device, it is desirable to provide a mobile device and method for proximity detection verification.

In addition, the portable electronic devices can also include touch screen displays that are controlled by a touch screen circuit that allows for touch inputs to be activated by a user. Touch screen displays can be subject to inadvertent actuation by a user when the device abuts a user's face such as when making a phone call. Therefore, a proximity sensor is often used to aid in identifying when a device is abutting a user's face. Because the proximity sensor is also subject to inadvertent actuation by a gesture performed by a user, it is desirable to provide a mobile device and method for proximity detection verification.

DETAILED DESCRIPTION

Figure 1:
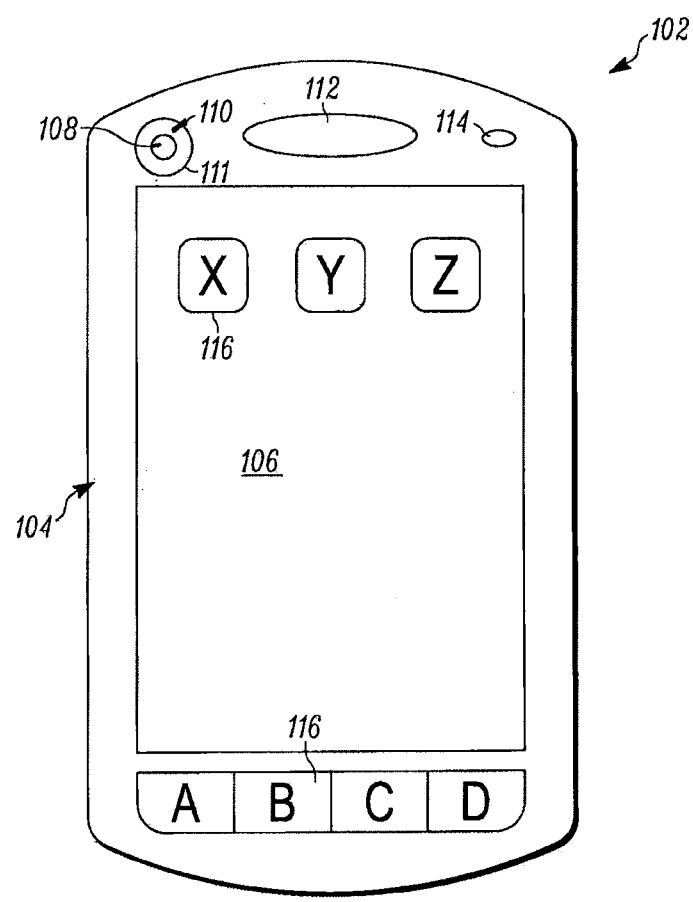
FIG. 1 is a front view of an exemplary mobile device.

A mobile device with a touch screen display includes an illuminated graphics screen. The mobile device further includes a proximity sensor to sense if a user is in close proximity to the display, and a touch screen circuit coupled to the touch screen display for receiving touch inputs. Utilizing the proximity sensor, a proximity determination can be performed by the mobile device to ascertain whether the mobile device is in close proximity to a user, which may occur during the commencement of a telephone call. If during a telephone call it is determined by the mobile device that a user is in close proximity to the display, the mobile device presumes that the user does not require the use of the display or the touch screen, therefore, the mobile device can disable the display to conserve power and disable the touch screen circuit to prevent inadvertent actuation of one or more touch inputs by a user's body (e.g., cheek, ear, etc).

Some mobile devices include a proximity sensor positioned about the front side of the device, such as near a speaker of the device, which detects when a user's face is near the device (close proximity), such as occurs during a telephone call. Detection of close proximity can then serve as a sole trigger for turning off a display or disengaging a touch screen circuit. Although the proximity sensor can be used in this manner to accomplish disablement of the display and touch screen circuit, the proximity sensor is also subject to inadvertent actuation. As mobile devices have evolved, the number of touch inputs and various other sensors and components has increased; this development has substantially increased the likelihood that the proximity sensor will be triggered by a gesture as opposed to the close proximity of a user's face. As a result, while performing a gesture, a user can inadvertently trigger the disablement of the display and the touch screen circuit, creating a substantial inconvenience. To reduce the likelihood of an inadvertent disablement, the proximity sensor can be used in conjunction with a camera of the mobile device to provide a verification signal before disabling the display and touch screen circuit.

More particularly, the mobile device can be configured to detect a user's face positioned in front of a lens of the camera to determine, using facial recognition software, if a user is in a position to view the display. When a user's face is detected in a manner that allows for the assumption that the user is viewing the display, for example if two eyes are detected, a signal is provided to indicate that a user is in a position to view and operate the touch screen display. The camera can also include an auto-focus feature, with a feedback signal that can indicate the position of the lens. The lens position can also be utilized to determine how far away a user is from the mobile device. More particularly, the lens is moved in one direction to focus on a user positioned in close proximity, and in an opposite direction to focus on a user that is in far proximity. By measuring the position of the lens relative to a fixed point and utilizing a proximity-sensing algorithm, the mobile device can calculate the distance from the camera to a user. Among other things, monitoring the lens position in this manner allows the camera to be utilized as a proximity sensor without the need for facial recognition. The lens position detection and/or facial recognition features of the mobile device can be used in combination with the proximity sensor to provide verification of a close proximity determination by the proximity sensor, thereby minimizing inadvertent disablement of the backlight and touch screen circuit.

Referring now to FIG. 1, an exemplary mobile device 102 is provided that can take the form of a mobile phone (as more fully described with respect to FIG. 2), which can include functions such as image acquisition, calling, emailing, texting, and internet browsing functions, as well as others. In other embodiments, the mobile device can be one of a variety of other electronic devices that can include mobile device capabilities, such as a personal digital assistant or tablet. As shown, the mobile device 102 includes a front side 104 with a display 106 positioned thereon, where the display 106 is generally directed towards and viewable by a user when the user is operating the mobile device 102 in certain ways. The display 106 can take the form of a graphical display utilizing a graphics driver circuit for providing graphics on the display and a backlight 217 (FIG. 2) for illuminating the graphics, such as a backlit Liquid Crystal Display (LCD). The backlight 217 can also provide illumination for one or more navigation keys that are not integral to the display 106. In at least some other embodiments, the display 106 includes a graphical display utilizing a graphics driver circuit for providing graphics on the display wherein the light source is integral, such as an Active Matrix Light Emitting Diode (AMOLED) display.

Further, the mobile device 102 includes a touch screen circuit 227 for receiving touch inputs 116 about the display 106. In addition, the mobile device 102 includes a front facing camera 108, which is positioned substantially inside the mobile device 102 and includes a camera lens 110 for acquiring images through an aperture 111 of a scene positioned in front of the display 106. The camera 108 can include an auto-focus feature and a feature for tracking the position of the lens 110. The mobile device 102 further includes a speaker 112 for listening to audio from the mobile device 102, and one or more touch input buttons 116 are provided about the front side 104. The touch input buttons 116 can be included as a portion of the display screen or separate therefrom, and one or more of the touch input buttons 116 are in communication with the touch screen circuit 227. Further, a proximity sensor 114 is provided for sensing if the mobile device is in close proximity to a user, more particularly, a portion of a user's face, such as when a telephone call is in progress. In at least some embodiments, the sensor 114 is an infra-red proximity sensor, described and/or implemented at least in part as in U.S. Pat. No. 6,246,862 entitled "SENSOR CONTROLLED USER INTERFACE FOR PORTABLE COMMUNICATION DEVICE," which is incorporated by reference herein. Although shown and described as an infra-red proximity sensor 114, the sensor 114 could alternately employ Capacitive, Inductive, Sonic, Radio Frequency (RF) or other sensing techniques.

As discussed above, to reduce the likelihood of inadvertently triggering the disablement of the display 106 and the touch screen circuit 227, the proximity sensor 114 and camera 108 can be utilized to verify when a disablement is likely to be appropriate. More particularly, by crosschecking a signal from the proximity sensor 114 with a signal from the camera 108, the likelihood of disabling the display 106 and the touch screen circuit 227 due to an inadvertent gesture is substantially reduced.

Figure 2:
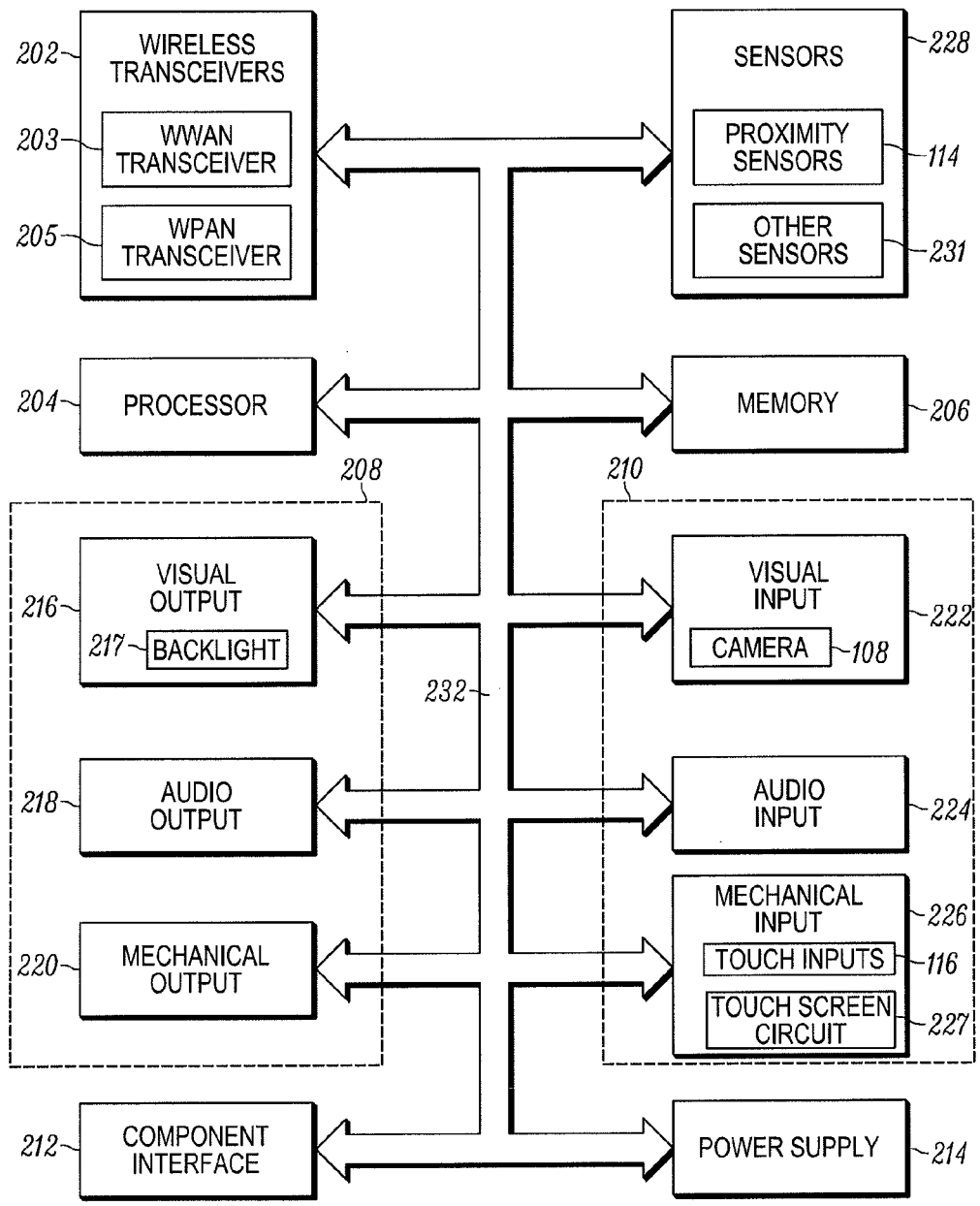
FIG. 2 is a block diagram of the exemplary mobile device of FIG. 1.

Referring to FIG. 2, there is provided a block diagram illustrating exemplary internal hardware components 200 of the mobile device 102 of FIG. 1, in accordance with the present embodiment. As shown in FIG. 2, the internal components 200 include one or more wireless transceivers 202, a processor 204 (e.g., one or more of microprocessor(s), microcomputer(s), application-specific integrated circuit(s), etc.), memory 206, one or more output devices 208, and one or more input devices 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 102 to be portable. Further, the internal components 200 additionally include one or more sensors 228. All of the internal components 200 can be coupled to one another, and in communication with one another, by way of one or more internal communication links 232 (e.g., an internal bus).

Each of the wireless transceivers 202 utilizes a wireless technology for communication, which can include for example (but are not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth or IEEE 802.11 (a, b, g or n), or other wireless communication technologies such as infra-red technology. In the present embodiment, the wireless transceivers 202 include a cellular transceiver 203 and a wireless local area network (WLAN) transceiver 205, although in other embodiments only one of these types of wireless transceivers (and possibly neither of these types of wireless transceivers and/or additional types of wireless transceivers) is present. It should be understood that, while the present embodiment includes the wireless transceivers 202, each of which can be understood to include both a wireless receiver and a wireless transmitter, in other embodiments the receiver and transmitter for any given type of wireless technology can be distinct components, and/or a receiver for a given type of wireless technology can be present even though a transmitter for that wireless technology is not present, or vice-versa (a transmitter is present while a receiver is not).

By virtue of the use of the wireless transceivers 202, the mobile device 102 is capable of communicating with a variety of external components such as cell towers, access points/hotspots, and other devices. Operation of the wireless transceivers 202 in conjunction with others of the internal components 200 of the mobile device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted. The wireless transceivers 202 convey the modulated communication signals by way of wireless (as well as possibly wired) communication links (not shown) to other devices such as cell towers, access point/hotspots, or remote server or a variety of other remote devices.

Depending upon the embodiment, the input and output devices 208, 210 of the internal components 200 can include a variety of visual, audio and/or mechanical outputs. For example, the output device(s) 208 can include one or more visual output devices 216 such as the display screen 106 (e.g., a backlit graphics screen), one or more audio output devices 218 such as a speaker, alarm, and/or buzzer, and/or one or more mechanical output devices 220 such as a vibrating mechanism. The visual output devices 216 among other things can also include a video display screen. Likewise, by example, the input device(s) 210 can include one or more visual input devices 222 such as the camera 108, one or more audio input devices 224 such as a microphone, and/or one or more mechanical input devices 226 such as a camera lens position sensor, flip sensor, keyboard, keypad, selection button, navigation cluster, touch pad, capacitive sensor, motion sensor, and/or switch. Images acquired by the camera 108 can be saved in the memory 206 and/or analyzed by the processor running a face detection algorithm, for example. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

Additionally, while in FIG. 2 the input devices 210 are shown to be distinct from the output devices 208, it should be recognized that in some embodiments including the present embodiment one or more devices serve both as input device(s) and output device(s). That is, in the present embodiment of FIG. 1, the display 106 of the mobile device 102 is a user interface with touch sensing capability that comprises both one or more of the visual output devices 216, insofar as the display outputs images, such as an image that correlates to a touch input 116, as well as one or more of the mechanical input devices 226, insofar as the touch inputs 116, driven by the touch screen circuit 227, are sensed/actuable about the display screen 106. In other embodiments, other types of devices can be used that should be considered both among the input devices 210 and the output devices 208.

As mentioned above, the internal components 200 also can include one or more of various types of sensors 228. The sensors 228 can include, for example, proximity sensors 114 and other sensors 231, such as a light detecting sensor, an ultrasound transceiver or an infrared transceiver, touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface of the mobile device 102. While the sensors 228 for the purposes of FIG. 2 are considered to be distinct from the input devices 210, in other embodiments it is possible that one or more of the input devices can also be considered to constitute one or more of the sensors (and vice-versa). For purposes of the present description, the display 106 is considered to not be (and to not include) any of the sensors 228, although the touch sensing capability of the display 106 could alternately be considered as being among the sensors.

The memory 206 of the internal components 200 can encompass one or more memory devices of any of a variety of forms (e.g., read-only memory, flash memory, random access memory, static random access memory, dynamic random access memory, etc.), and can be used by the processor 204 to store and retrieve data. In some embodiments, the memory 206 (or a portion thereof) can be integrated with the processor 204 (or a portion thereof) in a single device (e.g., a processing device including memory or processor-in-memory (PIM)), albeit such a single device will still typically have distinct portions/sections that perform the different processing and memory functions and that can be considered separate devices. The data that is stored by the memory 206 can include, but need not be limited to, operating systems, programs (applications), and informational data. Each operating system includes executable code that controls basic functions of the mobile device 102, such as interaction among the various components included among the internal components 200, communication with external devices via the wireless transceivers 202 and/or the component interface 212, and storage and retrieval of programs and data, to and from the memory 206.

As for programs, each program includes executable code that utilizes an operating system to provide more specific functionality, such as file system service and handling of protected and unprotected data stored in the memory 206. Although many such programs govern standard or required functionality of the mobile device 102, in many cases the programs include applications (or simply "apps") governing optional or specialized functionality, which can be provided in some cases by third party vendors unrelated to the mobile device manufacturer.

Finally, with respect to informational data, this is non-executable code or information that can be referenced and/or manipulated by an operating system or program for performing functions of the mobile device 102. Such informational data can include, for example, data that is preprogrammed upon the mobile device 102 during manufacture, or any of a variety of types of information that is uploaded to, downloaded from, or otherwise accessed at servers or other devices with which the mobile device 102 is in communication during its ongoing operation. The mobile device 102 can be programmed such that the processor 204 and memory 206 interact with the other components of the mobile device to perform various functions, such as to control the backlight 217 and other components as described below.

Figure 3:
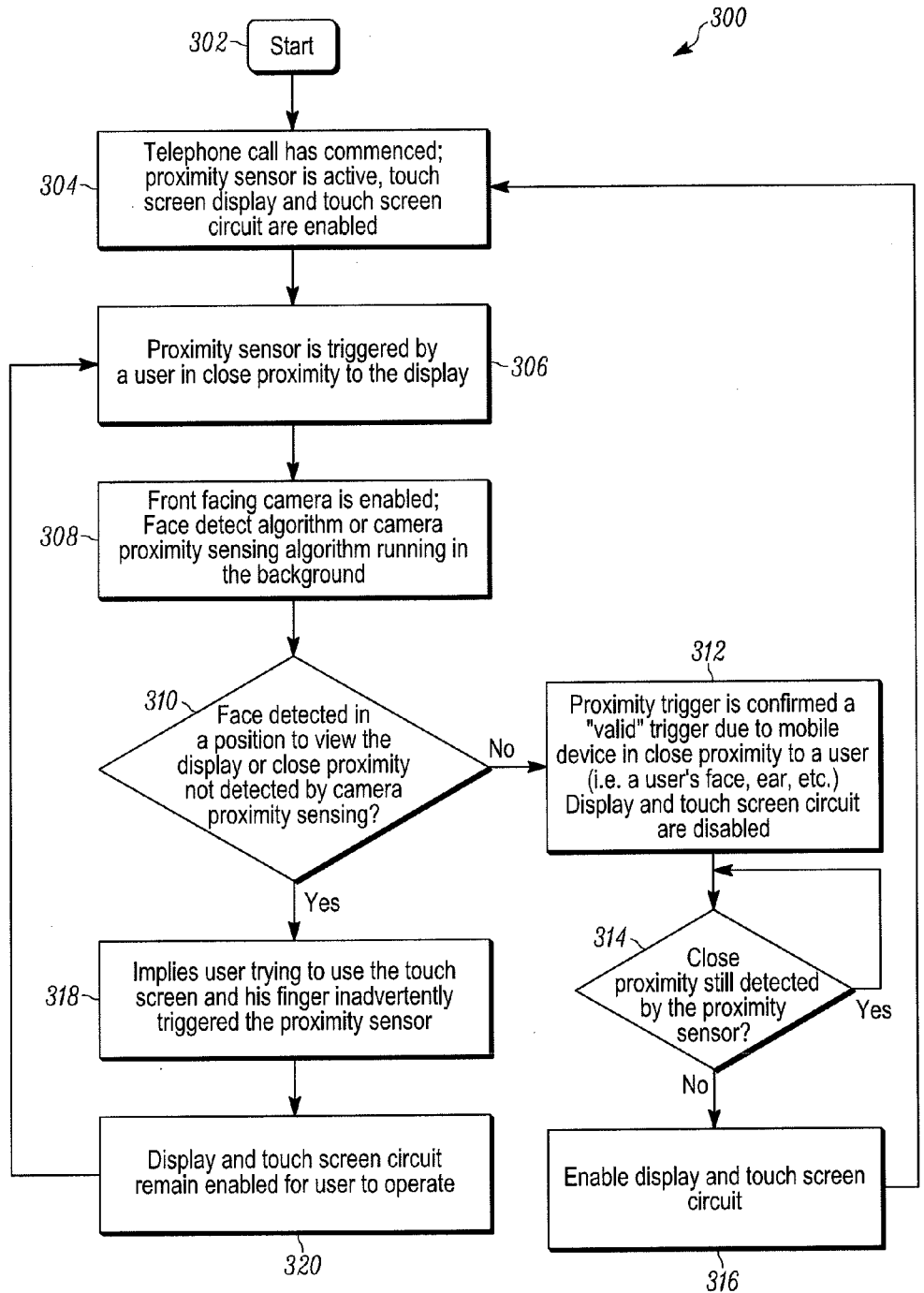
FIG. 3 is a flowchart showing steps of an exemplary method that can be performed by the mobile device of FIGS. 1 and 2.

Referring to FIG. 3, flowchart 300 shows steps of an exemplary method that can be performed by the mobile device 102 of FIGS. 1 and 2 to disable the display 106 and the touch screen circuit 227. The method starts at a step 302, wherein the display 106 is on and the touch screen circuit 227 is engaged. At a step 304, the mobile device is activated to initiate or receive a telephone call, thereby activating the proximity sensor 114 to sense the proximity of a user to the display 106 and provide an output indicative of thereof. At a step 306, if an object or user is detected as being in close proximity to the mobile device, then the sensor 114 outputs a signal indicative thereof. This close proximity indication or triggering of the sensor 114 activates the front facing camera 108 at step 308 and the camera acquires one or more images and/or the autofocus feature of the camera adjusts the position of the lens and provides lens position information. The acquired images and/or lens position information can then be analyzed, using the processor and memory and running a face detection algorithm on the images and/or a proximity-sensing algorithm using the position of the lens to estimate proximity of an object or user from the camera. An exemplary proximity-sensing algorithm for the lens position can include comparing the position of the lens with lens position data that has been correlated with distance data, the distance data representing the distance between at least one of the display and the lens and the user which the lens is focused on, wherein a threshold position is a non-variable data value chosen from at least one of the lens position data and distance data that is associated with a close proximity of the display to the user. In addition, the lens position and lens position data can be acquired from a plurality of sources that are capable of providing direct data or feedback data that varies with respect to the lens position, such as a position indicator on a lens step motor. At step 310, a determination is made based on the analysis of whether a face is or is not in a position to view the display and/or whether a user is or is not in close proximity to the mobile device. If the analysis determines that a face is not in a position to view the display and/or that user is in close proximity to the camera 108, then processing proceeds to a step 312. At step 312, the close proximity indication by the sensor 114 is assumed to be valid and not the result of an inadvertent gesture, and therefore the display 106 and the touch screen circuit 227 are disabled, and processing proceeds to a step 314. At step 314, a determination is made if close proximity is still detected. If close proximity is no longer detected by the sensor 114, then processing proceeds to a step 316. At step 316, the display 106 and the touch screen circuit 227 are enabled and processing then proceeds to step 304.

Turning again to step 310, if a face is detected in a position to view the display or if close proximity of a user is sensed by the camera 108, then processing proceeds to a step 318. At step 318 the mobile device 102 assumes that the close proximity determination of the sensor 114 was the result of an inadvertent gesture and not a valid trigger, so the display 106 and the touch screen circuit 227 remain enabled and the method returns to step 306. Although not addressed in the flowchart 300, unless turned off by this or another method, the display 106 can be configured to stay on for a pre-selected amount of time.

Further, although the display 106 and touch screen circuit 227 are described as being activated or deactivated generally at the same time, in at least some embodiments, the display 106 and the touch screen circuit 227 may be activated or deactivated at different times. In another embodiment, only one of the display 106 and the touch screen circuit 227 may be activated or deactivated by this method.

It is specifically intended that the present invention not be limited to the embodiments and illustrations contained herein, but include modified forms of those embodiments, including portions of the embodiments and combinations of elements of different embodiments as come within the scope of the following claims.

We claim:

1. A method for proximity detection verification, the method comprising:
    enabling a touch screen display and a touch screen circuit on a mobile device;
    activating a proximity sensor with a commencement of a telephone call;
    receiving from the proximity sensor an indication that a user is in close proximity to the display;
    acquiring one or more images of a scene in front of the touch screen display;
    analyzing the one or more images to determine if the user is in a position to view the display; and
    disabling at least one of the display or the touch screen circuit if the proximity sensor provides the indication that the user is in close proximity to the display and a processor of the mobile device determines based upon the analyzing that the user is not in a position to view the display.

2. The method of claim 1, wherein the disabling is of both of the display and the touch screen circuit.

3. The method of claim 1, further including not disabling at least one of the display or the touch screen circuit if an additional determination is made.

4. The method of claim 1, further including initiating a face detection algorithm for the analyzing of the one or more images to determine if the user is in a position to view the display.

5. A mobile device comprising:
    a touch screen display;
    a touch screen circuit for receiving touch inputs;
    a proximity sensor configured to provide an indication that a user is in close proximity to the touch screen display;
    a camera configured to acquire one or more images in front of the display; and
    a processor being effective to determine, in response to the indication of the proximity sensor, whether the user is in a position to view the display based on the one or more images of the camera,
    wherein if the proximity sensor provides the indication that the user is in close proximity to the display and the processor determines, based on the one or more images, that the user is not in a position to view the display, then at least one of the display or the touch screen circuit are disabled.

6. The mobile device of claim 5, wherein if the proximity sensor provides the indication that the user is in close proximity to the display and the processor determines, based on the one or more images, that the user is not in a position to view the display, then the display and the touch screen circuit are disabled.

7. The mobile device of claim 5, wherein if the proximity sensor provides the indication that the user is in close proximity to the display and the processor determines, based on the one or more images, that the user is in a position to view the display, then at least one of the display or the touch screen circuit are not disabled.

8. The mobile device of claim 7, wherein the touch inputs each include a corresponding graphic icon to identify a corresponding function of that touch input, and the function is actuated by a user touching the location of the icon on the display.

9. The mobile device of claim 7 wherein the proximity sensor is activated with a commencement of a telephone call.

10. The mobile device of claim 7, wherein the processor uses a face detection algorithm for analyzing the one or more images.

11. The mobile device of claim 7, wherein the camera includes an auto-focus lens with a lens position indicator for monitoring the position of the lens relative to a fixed position.

12. The mobile device of claim 11, wherein the processor monitors the lens position indicator and determines if the user is in close proximity to the display by analyzing the position of the lens.

13. The mobile device of claim 12, wherein a determination by the processor that the user is in close proximity to the display by analyzing the position of the lens is utilized to confirm a close proximity indication by the proximity sensor.

14. A method for proximity detection verification, the method comprising:
    enabling a touch screen display and a touch screen circuit on a mobile device;
    activating a proximity sensor with a commencement of a telephone call;
    receiving from the proximity sensor an indication that a user is in close proximity to the display;
    acquiring one or more images of a scene in front of the touch screen display;
    focusing a camera lens on the user positioned in front of the display;
    analyzing the one or more images and the position of the lens with reference to a threshold position to determine if the user is in close proximity to the display; and
    disabling at least one of the display or the touch screen circuit if the proximity sensor provides the indication that the user is in close proximity to the display and a processor of the mobile device determines based upon the analyzing that the user is not in a position to view the display.

15. The method of claim 14, further including re-enabling at least one of the display or touch screen circuit upon receiving an additional indication by the proximity sensor that the object is no longer in close proximity.

16. The method of claim 14, further including not disabling at least one of the display or the touch screen circuit if an additional determination is made.

17. The method of claim 14, further including providing a proximity-sensing algorithm that compares the position of the lens with lens position data that has been correlated with distance data, the distance data representing the distance between at least one of the display or the lens and the user the lens is focused on, wherein the threshold position is a non-variable data value chosen from at least one of the lens position data or distance data that is associated with a close proximity of the display to the user.

* * * * *